United States Patent [19]

Stoll

[11] 4,378,726

[45] Apr. 5, 1983

[54] PISTON DESIGNED FOR USE WITH A MAGNETIC FORCE PICKUP

[76] Inventor: Kurt Stoll, Lenzhalde 72, 7300 Esslingen/N, Fed. Rep. of Germany

[21] Appl. No.: 206,104

[22] Filed: Nov. 12, 1980

[30] Foreign Application Priority Data

Nov. 24, 1979 [DE] Fed. Rep. of Germany ....... 2947516

[51] Int. Cl.³ .............................................. F16J 9/08
[52] U.S. Cl. ...................................... 92/243; 92/5 R; 92/249; 91/DIG. 4
[58] Field of Search ................. 92/243, 244, 255, 260, 92/249, 5 R, 5 L; 91/1, DIG. 4; 277/80, 81 P, 205, 206

[56] References Cited

U.S. PATENT DOCUMENTS

| 2,487,390 | 11/1949 | Smith | 92/243 |
| 2,596,516 | 5/1952 | Wellington | 92/243 |
| 3,956,973 | 5/1976 | Pomplas | 92/243 |

FOREIGN PATENT DOCUMENTS

| 2163840 | 6/1973 | Fed. Rep. of Germany. | |
| 7722958 | 12/1977 | Fed. Rep. of Germany. | |
| 2917232 | 11/1979 | Fed. Rep. of Germany | 92/5 R |
| 2915212 | 10/1980 | Fed. Rep. of Germany | 92/5 R |
| 2056692 | 3/1981 | United Kingdom | 92/5 R |

*Primary Examiner*—Paul E. Maslousky
*Attorney, Agent, or Firm*—Flynn, Thiel, Boutell & Tanis

[57] ABSTRACT

A permanent magnet on a piston for use with a magnetic force pickup for sensing the position of the piston is locked in place between two backup rings and is seated within the washer of the piston. The washer has two inwardly extending flanges placed on the two axial sides of the permanent magnet between it and the backup rings.

6 Claims, 3 Drawing Figures

PISTON DESIGNED FOR USE WITH A MAGNETIC FORCE PICKUP

BACKGROUND OF THE INVENTION (1) Field of the invention

The present invention relates to a piston designed for use with a magnetic force pickup for contactlessly sensing a position of the piston, including a piston body with a circumferential outer face and a circumferential groove, a sealing washer having two radially inwardly extending flanges, and a permanent magnet which is placed in the washer towards the outer face of the piston and in said groove, the magnet furthermore having generally axial end faces next to and covered by the flanges.

(2) Description of the prior art

Such pistons with their permanent magnets are used together with a pickup or sensor placed in or outside the cylinder in which the piston is placed. The pickup is responsible for producing an electrical signal when the piston in the cylinder has come into a given position, valves then being worked for the input of working fluid into the working spaces of the cylinder so that the direction of motion of the piston is changed.

In the prior art, the piston washer and the permanent magnet have generally been produced as separate parts which have to be separately handled and put in position, this making the system complex. Furthermore in German Gebrauchsmuster patent No. 7,722,958 a suggestion has been made for placing a permanent magnet in the form of a two-part ring in a circumferential groove of the piston (in the form of a single-piece ring) and on the other hand, by moving it outwards, into an inner groove in the washer or gland fixed to the outer face of the piston, so that the permanent magnet is shut in between the piston and the gland. However, this prior art system has shortcomings, inasmuch as it is not completely fluid-tight on the magnet side and furthermore there is a danger of wear because of the washer's not being fully backed up at its sides, this causing a fretting or "kneading" effect as the washer is moved along backwards and forwards on its piston.

SUMMARY OF THE INVENTION

One purpose of the present invention is in this respect that of providing a piston of the sort noted in the first place that has a complete and full sealing effect, on the side running smoothly in its cylinder, and on the magnet side as well. A further purpose of the present invention is to make possible a low-price system on these lines which may readily be assembled and has the lowest possible wear rate.

For effecting these and other purposes in the present invention, a piston which is designed for use with a magnetic force pickup for contactlessly sensing a position of the piston has a piston body with a circumferential outer face and a circumferential groove therein, a sealing washer having two radially inwardly extending flanges, a permanent magnet which is placed in the washer towards the outer face of the piston and in the groove, said magnet furthermore having generally axial end faces next to and covered up by the flanges, which flanges extend inwards into the circumferential groove, and two piston wall parts limiting between them the circumferential groove and positioning the magnet and the two flanges therebetween.

One useful effect of the system of the invention is that because the magnet is embedded and cushioned within the washer and because the washer itself is provided within the piston, there is a full sealing effect not only against the inner face of the cylinder but furthermore on the magnet side of the washer. Furthermore, washer wear takes place at only a low rate, because the washer is fully supported and backed up at its two sides. The permanent magnet may be placed within the piston washer by forming the washer around it, that is to say in the process of making it, for example by injection molding or pressing the washer round the permanent magnet, or the magnet may be slipped into and keyed within the washer, this making assembly very much more simple, because the permanent magnet, the washer and the parts forming the piston body may be put together as a single unit which may be slipped onto the piston rod. On the other hand it is only to be seen from the prior art (see German Offenlegungsschrift specification No. 2,163,840) that the piston body, made up of a ring seated on the piston rod, may be covered up on the inner side by a flange of the washer which is seated on the outer face of the piston, the washer ring then being locked in position at the opposite side by a bent-round edge part of the end of the piston rod. Such a system, however, does not take care of the shortcomings noted earlier in connection with simple assembly, wear and poor sealing properties.

The fixing in position of the washer with the permanent magnet cushioned within it may be made even better if the axially spaced flanges on their sides turned away from the permanent magnet each have a ring-like groove therein for receiving an annular bead or ring on the two wall parts.

Further useful properties of the system of the invention are produced if there are round steel plates resting against the axial sides of the permanent magnet and placed between the permanent magnet and the flanges.

BRIEF DESCRIPTION OF THE DRAWINGS

A more detailed account will now be given of working examples of the invention using the accompanying figures.

DETAILED DESCRIPTION

Figure 1:
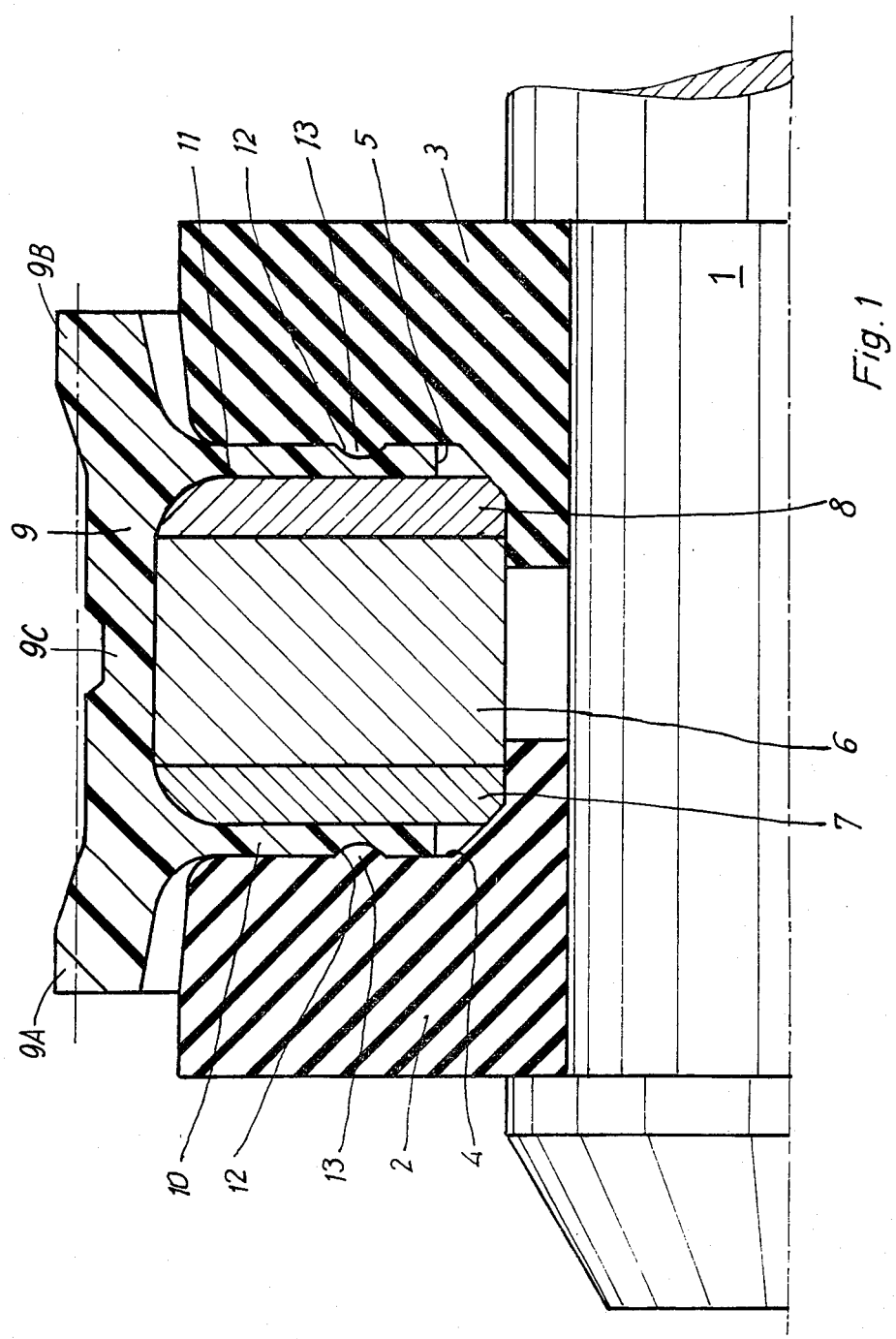
FIGS. 1 to 3 are fragmentary sectional views of three working examples of the piston of the present invention.

The piston to be seen in FIG. 1 is in part of known design and has two backup rings or wall parts 2 and 3 placed on a piston rod 1, the backup rings being best made of elastomeric material. They have faces which are turned towards each other and cut back at 4 and 5 for forming a circumferential groove. Unlike prior art pistons in which this circumferential groove is only used for taking up the piston washer, in the circumferential groove of the piston figured a many-part unit is placed, which is made up of a permanent magnet 6 sandwiched between two round steel plates 7, 8 and a pi ($\pi$) shaped piston washer 9 which is designed with two washer lips 9A, 9B. Washer 9, which is best made of elastomeric material as well, has a cylindrical band member 9C two radially inwardly extending flanges 10, 11 placed on the two axial sides of the nested together unit, that is to say steel plates 7 and 8 and permanent magnet 6. It is best for the piston washer 9 to be injection molded or snugly pressed onto the nested parts to form a unitary component. The axial faces of the washer flanges 10, 11 each have a ring-like groove 12 therein for receiving the rings or beads 13 formed on the opposite faces of backup rings 2, 3 so that flanges 10, 11 are keyed and locked in position. In this way the inner, nested-together parts forming a unit and the piston washer 9 around them are safely positioned in a circumferential groove 12 which is formed by the two cut back parts 4 and 5 of backup rings 2 and 3.

Figure 2:
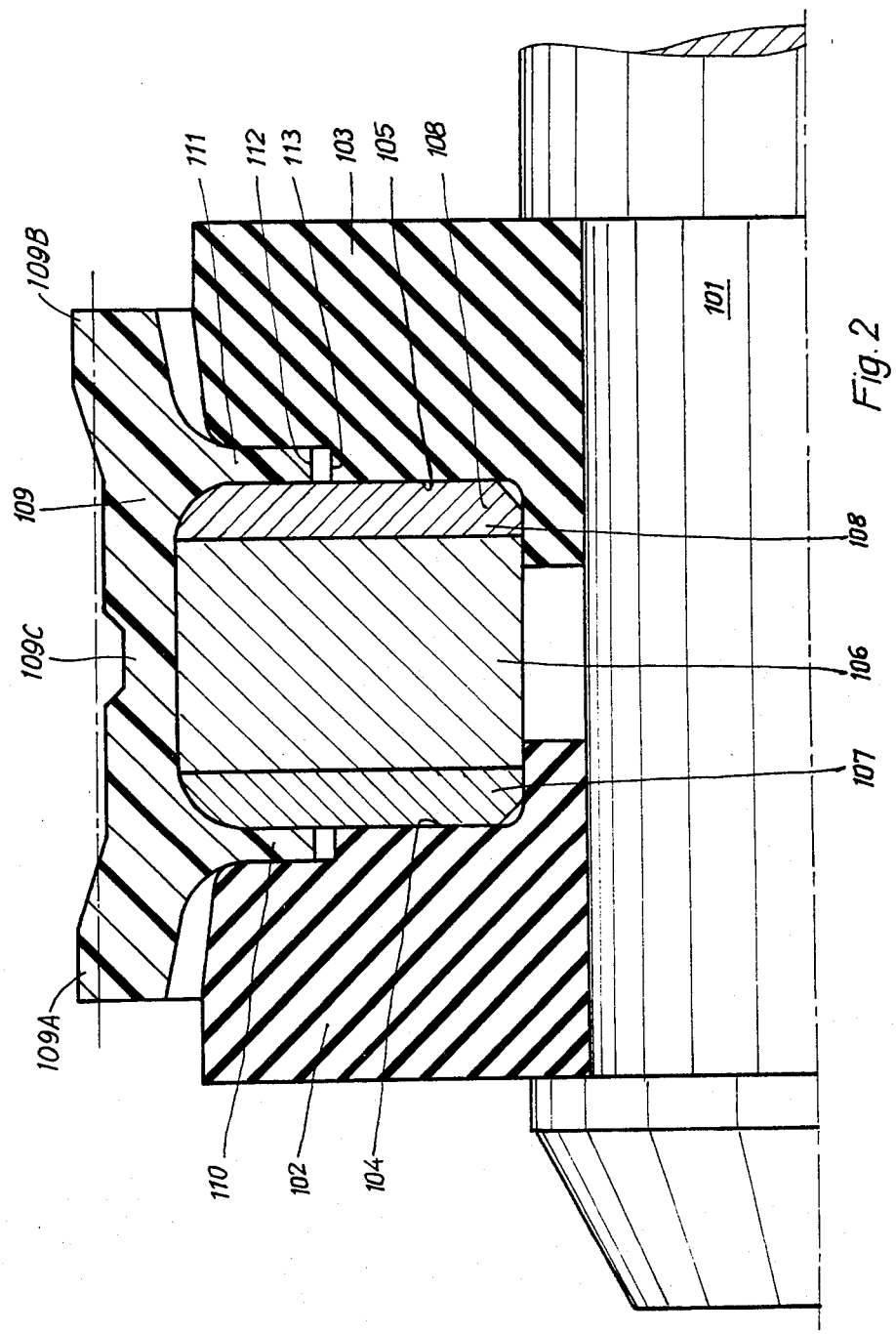

In important respects the working example of the piston to be seen in FIG. 2 is the same as that of FIG. 1, parts with the same function being given the same reference numbers but increased by 100. This further working example is namely different to that of FIG. 1 in that the permanent magnet 106 and the steel round plates 107, 108 on its two sides have been slipped into and elastically locked in the pi shaped piston washer 109, which is produced by pressing or injection molding. For this purpose the flanges 110 and 111 are somewhat shorter. The cut back parts 104 and 105 of the backup rings 102 and 103 are stepped as at 113 so that a stepped circumferential groove will be produced in whose middle and deeper part the nested unit made up of the two steel plates 107 and 108 and the permanent magnet 109 is seated while in the upper (or outer) broader part of the groove the flanges 110, 111 of the piston washer 109 are seated in addition. The terminal ends 112 of the flanges 110, 111 are used for cooperation with the stepped parts 113 of cut back parts 104, 105 on the same lines as the ring-like grooves 12 and the beads or rings 13 in the system of FIG. 1 for keeping the complete structure together more safely.

Figure 3:
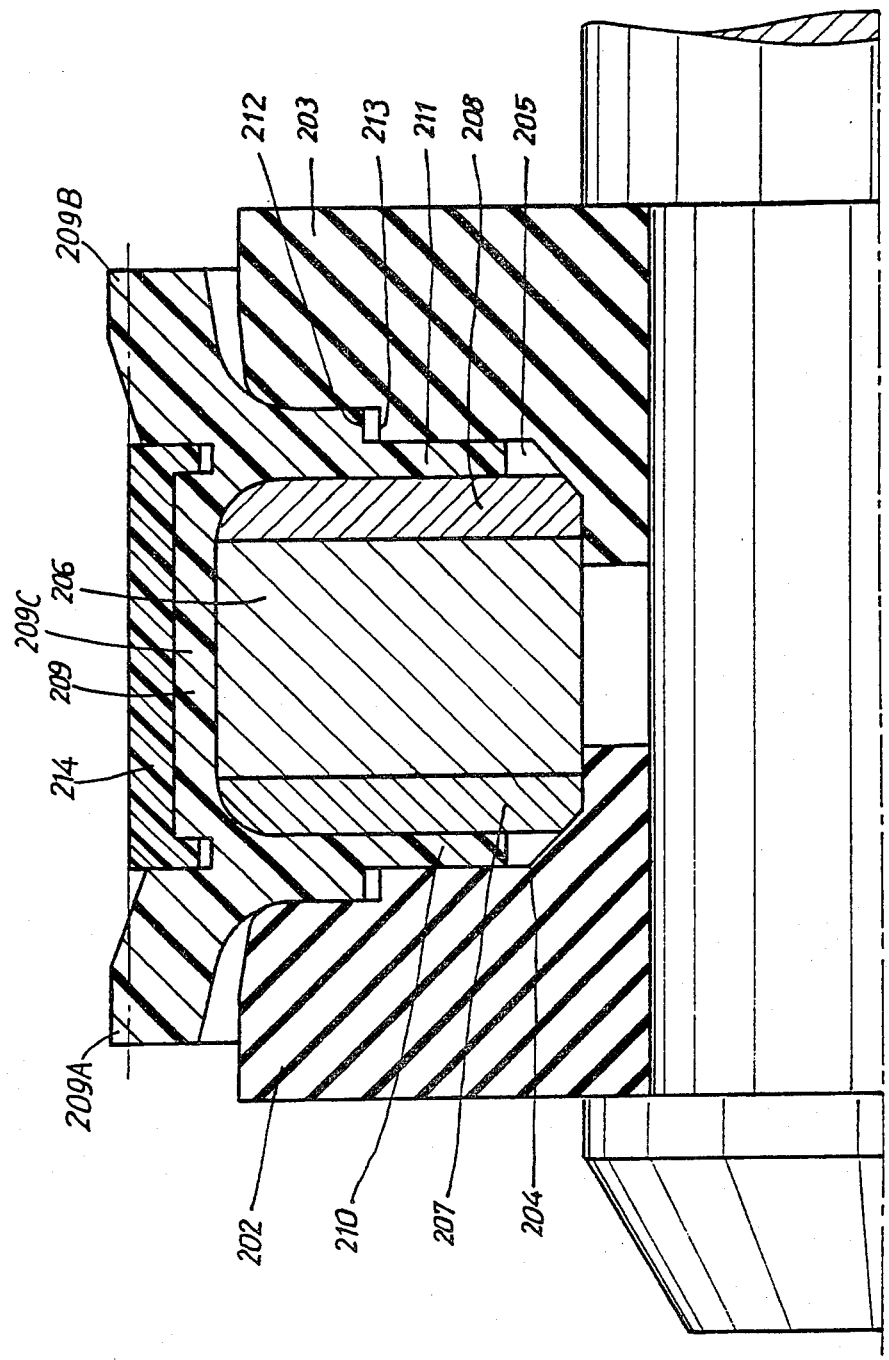

The working example of FIG. 3 is also in some details very much like that of FIG. 1, so that again parts with the same function have been given the same numbers, the numbers however being increased by 200. Again the nested unit made up of the permanent magnet 206 and steel plates 207, 208 has been positioned within the pi-shaped piston washer 209 by injection molding or pressing the same round it. The nested unit is placed between backup rings 202, 203. The flanges 210, 211 and hollows 204, 205 have steps 212 and 213 which, on the same lines as the ring-like grooves 12 and the beads or rings 13 of the system of FIG. 1, are used for more safely locking the unit as such in position. In addition, in this case, over the nested unit on the outer face of piston washer 209 there is a guide ring 214 provided within the material of the washer. This guide or spacer ring 214 has an outer diameter which is the same as the inner diameter of the cylinder and is best made of a thermoplastic material.

The embodiments of the invention in which an exclusive property or privilege is claimed are defined as follows:

1. A piston, comprising means defining a generally cylindrical piston body having a circumferential groove therein, said groove having sidewalls, a sealing washer concentrically encircling said body in radial alignment with said groove and having two axially spaced annular flanges which project substantially radially into said groove and engage said sidewalls thereof, an annular magnet disposed in said groove between said flanges of said sealing washer, two annular plates disposed in said groove between said flanges of said sealing washer and on opposite axial sides of said magnet, and an annular guide ring support on and concentrically encircling said sealing washer.

2. The piston according to claim 1, including cooperating means on said piston and said flanges of said sealing washer for maintaining said sealing washer substantially in a predetermined position.

3. The piston according to claim 2, wherein said cooperating means includes cooperating steps provided on said walls of said groove and on said flanges of said sealing washer.

4. The piston according to claim 1, wherein said sealing washer is made of an elastomeric material and said guide ring is made of a thermoplastic material.

5. In a piston having means defining a generally cylindrical piston body with a circumferential groove therein with axially spaced sidewalls, the improvement comprising wherein a unitary elastomeric generally pi ($\pi$) shaped annular sealing ring is provided having a pair of axially spaced, radially inwardly extending flanges thereon connected by a cylindrical band member, the axial ends of which project axially beyond the location of said flanges, a pair of annular metal plates, an annular magnet sandwiched between said pair of annular metal plates and being housed between said flanges and occupying the majority of the space between said flanges, means for securing said annular sealing ring, said pair of annular metal plates and said annular magnet together to define a unitary component, said unitary component being received in said groove with said flanges engaging said sidewalls of said groove.

6. The piston according to claim 5, wherein locking means are provided on said unitary component and said sidewalls of said groove to fixedly orient said unitary component in said groove.

* * * * *